T. S. PARKER.
Hypodermic Syringe.
No. 201,443.  Patented March 19, 1878.
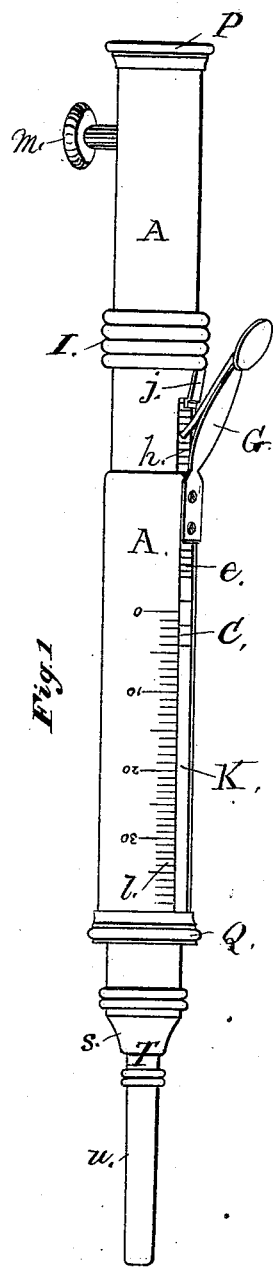
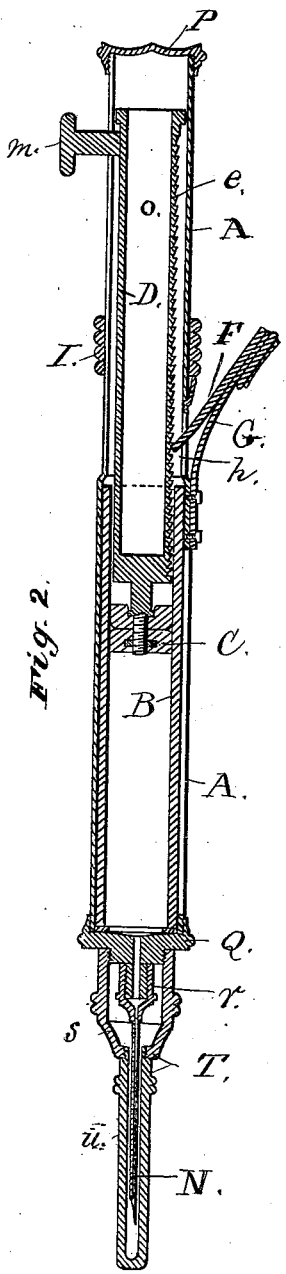
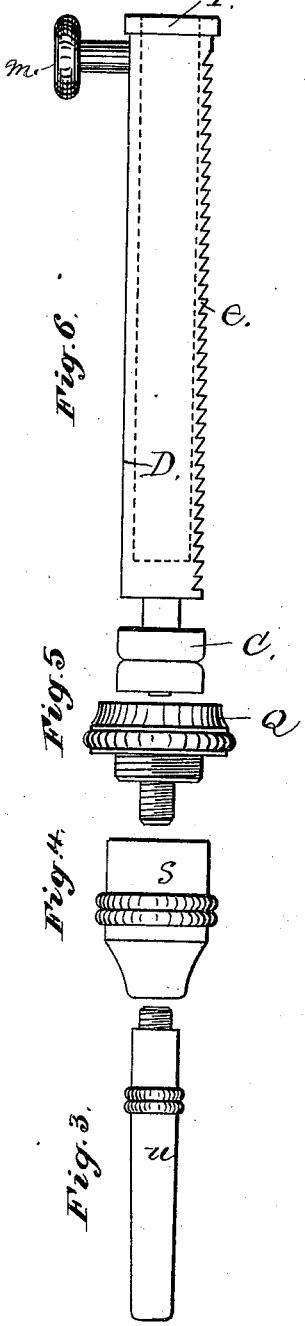
Witnesses.
W. R. Edelen.
Penn H. Halsted.
Inventor.
Thomas S. Parker
per John J. Halsted,
Atty.

UNITED STATES PATENT OFFICE.

THOMAS S. PARKER, OF COHOES, NEW YORK.

IMPROVEMENT IN HYPODERMIC SYRINGES.

Specification forming part of Letters Patent No. 201,443, dated March 19, 1878; application filed September 3, 1877.

*To all whom it may concern:*

Be it known that I, THOMAS S. PARKER, of Cohoes, in the county of Albany and State of New York, have invented certain new and useful Improvements in Hypodermic Syringes; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to syringes for injecting medicinal solutions or anæsthetic liquids under the skin of the patient; and it consists of certain specialties of construction hereinafter set forth, having, primarily, for their object the accurate determining and indicating of the quantity of liquid administered to the patient at each injection, and the insuring ease and reliability in the operation.

In the drawings, Figure 1 is a side view of an instrument constructed in accordance with my invention; Fig. 2, a longitudinal section of the same; and Figs. 3 to 6, the several parts detached.

A is the outer case or barrel, of any suitable material; B, the glass or other vial or cylinder for containing the liquid; C, the solid piston within this cylinder or vial, and D the tubular stock or shank to which such piston is attached, and on the exterior of which is a series of uniform rack-teeth, $e$, adapted for a pawl, F, which is secured to a spring, G, fastened to the outside of case A, the pawl working through a slot, $h$, in said case, and, when pressed down, serving to propel the piston a positively measured distance. I is a slide having a short range of movement, and provided with a tongue or projection, $j$, adapted to be pushed beneath the pawl or dog F, and to lift it out of engagement with the teeth of the rack, so that when the implement is not in use the piston cannot be moved or the fluid disturbed by any movement of the pawl.

An opening, K, in the case permits an inspection of the liquid, and a scale or index, $l$, on the outside of the case is graduated to accord with the length and number of the teeth $e$ on the rack, so that there need be no guess or doubt as to the quantity of liquid ejected at each movement of the pawl.

A handle or knob, $m$, screwed into the rear end of the tube D, serves to retract or pull back the piston when it is desired to fill the vessel or vial B with the liquid, the probe or needle N in such case being placed in the liquid, and the retraction of the piston drawing the liquid into the instrument. The cavity $o$ within the hollow tube D is adapted for holding a small reserve vial of the anæsthetic or morphine solution; or it may be used to store one or more of the probes or needles.

P is a cap covering the rear end of the case. Q is a cap at the opposite end, and it is provided with a screw-threaded nipple to receive the head $r$, to which the probe is affixed, and also with another larger screw-threaded nipple to receive the larger portion $s$ of the needle-sheath T, the terminal portion $w$ being arranged to unscrew from T at a point such as to leave the portion of the needle or probe which projects beyond it of such proper length as to be sufficient for insertion into the skin, while the size and bluntness of the part T act as a guide to prevent the needle from going too far, and to a degree lessen the liability of oxidation from the liquid which may pass out from the needle.

In case the vessel or glass B should become broken, it can easily be renewed by simply unscrewing the cap Q.

The instrument can be made of any desired size or capacity, and may be varied in form so long as the essential features and principles of my invention are not departed from. It may be so constructed that the maximum quantity of liquid to be injected can be given at once; but the rapidity with which the injection can be given by my improved implement after the needle is inserted renders it unnecessary. Hence I have shown the graduations down to about the smallest quantity practically needed.

The advantages due to my manner of construction are the reliability and ease with which the device can be operated, reliability being of great importance, particularly in the case of children, with whom one drop in excess of morphine solution may cause serious, if not fatal, results.

In all hypodermic syringes with which I am acquainted the quantity of liquid injected is uncertain and not capable of being accurately determined beforehand, the apparatus heretofore in use having no provision for correctly indicating or measuring the same; but, on the contrary, it is left for conjecture or guess, the eye of the operator being the only means for judging of such quantity; and this mode of testing is necessarily unreliable, from the fact that in attempting to ascertain the amount injected after or before a given injection the scale or index will not indicate the truth, because the glass may not be held strictly perpendicular, so that the scale can show the actual level of the liquid, no matter how mathematically accurate the graduations on the scale upon the syringe may be.

The second point of advantage due to my invention is the ease with which the instrument can be worked with one hand, leaving the other hand free to pick up and hold the integuments, and therefore the operator has complete control of the needle, and there is but little liability of thrusting the point of the needle too deep and of wounding the vessels or nerves—a casualty not unlikely to happen with the existing modes of propelling the piston.

It will also be observed that by my construction the packing is always in contact with the liquid, so that, as long as there is any liquid within the vessel or vial the packing cannot become dry and recede from the sides of such vessel or tube. I thus avoid any delay or loss of time incident to getting the packing sufficiently moistened in order to charge the implement—an inconvenience of no trifling importance in urgent cases.

I claim—

1. In a hypodermic syringe, the combination, with the piston or plunger, of a pawl and rack for propelling the same.

2. The combination, with the rack on the stock of the piston, of a scale on the outside of the case or barrel, graduated to correspond with the teeth of such rack.

3. The combination of the rack on the piston or piston-rod, the spring-pawl F, and the slide I, substantially as and for the purpose set forth.

4. The combination, with a solid piston or plunger, of a chambered piston-stock adapted to store and hold a second or reserve vial of medicinal solution, or a duplicate needle or probe or a supply of the same, substantially as shown and described.

5. In combination with the needle or probe, a protecting cover or shield for the same, made in two parts, $s$ and $w$, adapted to be connected together or disconnected at a point between the butt and tip of the needle, as and for the purposes set forth.

THOMAS S. PARKER.

Witnesses:
 ABRAM A. OSTERHOUT,
 HARRIET E. PARKER.